United States Patent
Peng et al.

(10) Patent No.: US 9,991,998 B2
(45) Date of Patent: Jun. 5, 2018

(54) RATIO RESOURCE SHARING AND CONTENTION SCHEME FOR DEVICE-TO-DEVICE COMMUNICATION IN WHITE SPACE SPECTRUM BANDS

(75) Inventors: Tao Peng, Beijing (CN); Ziyang Liu, Beijing (CN); Wenwen Liu, Beijing (CN); Songling Wang, Beijing (CN); Zixi Fu, Beijing (CN); Haiming Wang, Beijing (CN); Tao Chen, Salo (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 170 days.

(21) Appl. No.: 14/359,951

(22) PCT Filed: Nov. 25, 2011

(86) PCT No.: PCT/CN2011/082992
§ 371 (c)(1),
(2), (4) Date: Jul. 18, 2014

(87) PCT Pub. No.: WO2013/075340
PCT Pub. Date: May 30, 2013

(65) Prior Publication Data
US 2014/0355557 A1    Dec. 4, 2014

(51) Int. Cl.
*H04L 5/00* (2006.01)
*H04W 16/14* (2009.01)
(Continued)

(52) U.S. Cl.
CPC .......... *H04L 5/0037* (2013.01); *H04L 5/0005* (2013.01); *H04W 16/14* (2013.01);
(Continued)

(58) Field of Classification Search
None
See application file for complete search history.

(56) References Cited

U.S. PATENT DOCUMENTS

2008/0130519 A1*  6/2008  Bahl .................... H04L 12/2602
                                                    370/254
2009/0238123 A1*  9/2009  Kuri ...................... H04L 1/0003
                                                    370/329
(Continued)

FOREIGN PATENT DOCUMENTS

CN         101227726         7/2008

*Primary Examiner* — Peter Chau
(74) *Attorney, Agent, or Firm* — Oblon, McClelland, Maier & Neustadt, L.L.P.

(57) ABSTRACT

The present invention discloses a method, an apparatus and a computer program for resource contention in device-to-device communication links. The method partitions the time-frequency radio resource grid with a resource block set forming the resource unit in the grid, for all available, used and unusable frequency bands around a given virtual central frequency. Each resource block set is partitioned into a common control channel and a data channel. With a given procedure of control data transmission between transmitting and receiving user terminals, the resources are competed and shared. Frequency shifting with short distance frequency change or frequency transference with a larger frequency hopping into a free radio resource is available. The competition procedure is done in order to fairly share the frequency bands as a function of time between different device-to-device communication links in a localized manner.

16 Claims, 7 Drawing Sheets

(51) Int. Cl.
*H04W 56/00* (2009.01)
*H04W 76/02* (2009.01)
*H04W 74/08* (2009.01)

(52) U.S. Cl.
CPC ..... *H04W 56/002* (2013.01); *H04W 56/0035* (2013.01); *H04W 76/023* (2013.01); *H04W 74/0808* (2013.01)

(56) References Cited

U.S. PATENT DOCUMENTS

| | | | |
|---|---|---|---|
| 2010/0069081 A1* | 3/2010 | Mitra ................. | H04W 72/042 455/452.2 |
| 2011/0007695 A1* | 1/2011 | Choi ................... | H04L 5/0007 370/329 |
| 2011/0182280 A1 | 7/2011 | Charbit et al. | |
| 2011/0317569 A1* | 12/2011 | Kneckt ............ | H04W 74/0833 370/252 |
| 2012/0014471 A1* | 1/2012 | Subramanian .... | H04L 25/03019 375/285 |
| 2012/0093098 A1 | 4/2012 | Charbit et al. | |
| 2012/0213183 A1* | 8/2012 | Chen ................ | H04W 72/1278 370/329 |
| 2012/0275405 A1* | 11/2012 | Kim .................... | H04W 72/08 370/329 |
| 2012/0322484 A1* | 12/2012 | Yu ...................... | H04W 4/08 455/509 |
| 2013/0090071 A1* | 4/2013 | Abraham ............ | H04W 16/14 455/73 |
| 2014/0099950 A1* | 4/2014 | Mildh ................ | H04W 56/001 455/434 |
| 2015/0085816 A1* | 3/2015 | Roh .................... | H04L 1/0003 370/329 |

\* cited by examiner

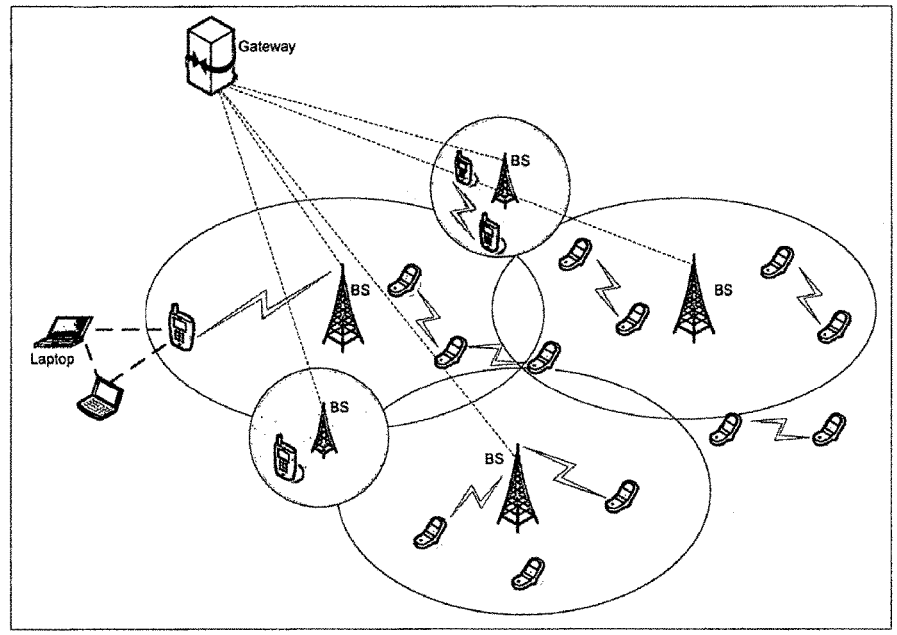
Figure 1        Prior art
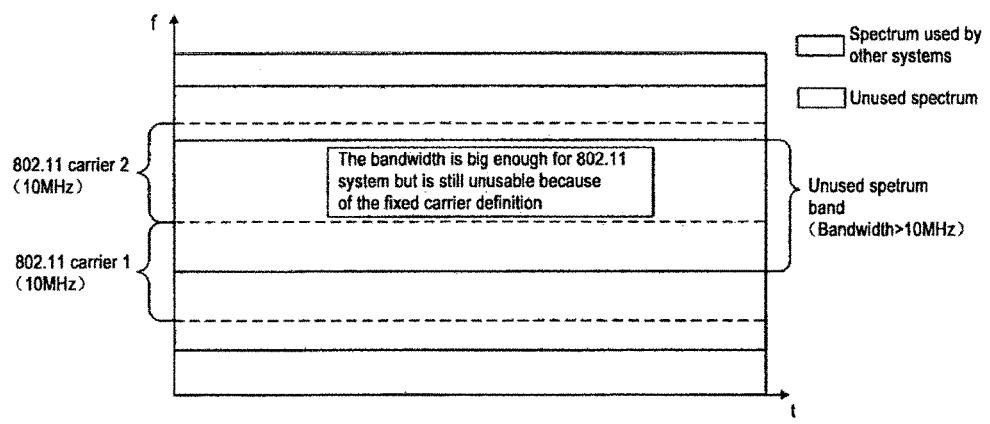
Figure 2a        Prior art

| RTS | | CTS | | DataCtrl | | ACK |
|---|---|---|---|---|---|---|
| TxUE ID | RxUE ID | TxUE ID | RxUE ID | Data Format | Other | ACK/NAK |
Figure 6b
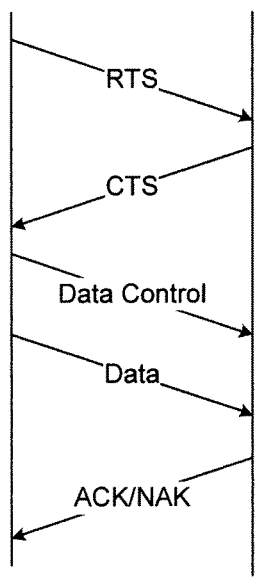
Figure 7
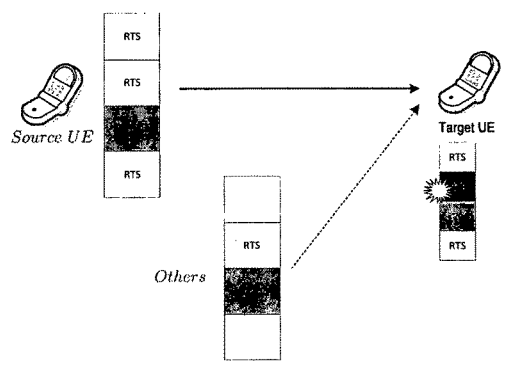
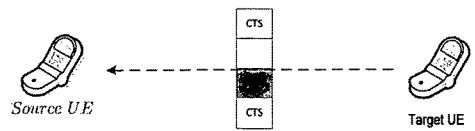
Figure 8

RATIO RESOURCE SHARING AND CONTENTION SCHEME FOR DEVICE-TO-DEVICE COMMUNICATION IN WHITE SPACE SPECTRUM BANDS

BACKGROUND OF THE INVENTION

Field of the Invention

The present invention relates to mobile communication networks, and especially to resource partitioning and sharing in device-to-device networks.

Description of the Related Art

The evolution of cellular wireless communication systems has been marked with different generations. $1^{st}$ generation (1G) included analog systems such as AMPS (Advanced Mobile Phone System) and NMT (Nordic Mobile Telephone) cellular phone networks, introduced in the early 1980s. The second generation (2G) introduced digital cellular telephony such as the GSM (Global System for Mobile Communications) standard, introduced in the early 1990s, which was standardized by the European Telecommunication Standards Institute (ETSI). GSM applies Time Division Multiple Access (TDMA) based radio interface. GSM is still the most widespread standard used in mobile communications.

After the 2G networks, $3^{rd}$ Generation Partnership Project (3GPP) has standardized globally applicable system specification for $3^{rd}$ generation mobile communication system. An example of such a system is a Universal Mobile Telecommunications System (UMTS) which applies Wideband Code Division Multiple Access (WCDMA) in the air interface. Original chip rate in WCDMA was specified as 3.84 Mcps and the nominal carrier spacing as 5 MHz. In 3GPP release 5, the concept of High-Speed Downlink Packet Access (HSDPA) has been introduced. It is an enhanced communications protocol in the High-Speed Packet Access family which allows higher data transfer speeds and capacity. With HSPDA, data rates up to 4 Mbps for packet switched data are supported. HSPA+ or "Evolved High-Speed Packet Access" is a subsequent wireless broadband standard, and it was defined in release 7. HSPA+ provides further increase in data rates by using higher order modulation methods (such as 64QAM) and by using multiple antenna techniques such as "multiple-input multiple-output" (MIMO) which means employing several antennas both in the transmitter and the receiver.

In release 8, a concept of Long Term Evolution (3GPP LTE) was introduced. Instead of the earlier WCDMA based radio access technology, Orthogonal Frequency Division Multiplexing (OFDM) is applied in LTE. Also, a dual cell HSDPA (DC-HSDPA) is introduced in release 8 which enables single User Equipment (UE) to receive on two adjacent carriers. Dual cell HSDPA is based on a primary and secondary carriers where the primary carrier provides all downlink physical channels together with channels supporting the uplink data transmission, comprising e.g. a first set of High Speed Physical Downlink Shared Channels (HS-PDSCHs) and High Speed Shared Control Channels (HS-SCCHs). The secondary carrier is responsible for transmitting a second set of HS-PDSCHs and HS-SCCHs. Release 8 allows data rate around 42 Mbps when dual cell functionality is used with 64QAM modulation.

Release 9 combined the dual cell HSDPA with MIMO functionality and also extends the dual cell approach to uplink direction. Furthermore, the used carriers may locate in two separate bands for downlink transmission, providing a dual band HSDPA (DB-HSDPA) operation. Bands can be distant, e.g. dual band configuration no 1 in release 9 is specified to represent downlink bands 925-960 MHz and 2110-2170 MHz. This aspect has great effect on planning the UE's RF parts so that the receiver is able to receive in these two bands simultaneously.

Release 9 has further been developed to a standard named as "LTE Advanced", represented by release 10 and fulfilling all $4^{th}$ generation system requirements. The LTE architecture comprises an Evolved UMTS Radio Access Network, abbreviated by E-UTRAN. Release 10 specifies for HSDPA a use of three or four carriers in the downlink direction. This means the UE can receive on four adjacent carriers each having a 5 MHz band. It will provide even higher data rates; with MIMO this approach makes possible data rates up to 168 Mbps.

At present, there are two different network types, which can be called, in this context, as a cellular network and an ad-hoc network. In a cellular network, the UE will go through a base station (BS) for the communication with another UE. However, in an ad-hoc network, the UE will communicate with another UE directly. In a cellular network mode, the traffic usually goes through a centralized controller such as an eNB even if the source and destination are close to each other. The main benefit of such an operation is an easy resource and interference control, but an obvious drawback is inefficient resource utilization. For example, double resources will be required for the cellular mode comparing with the direct transmission when two users are close to each other.

For achieving the best throughput in the system, a good option for the radio network is a multiple network scenario. Such an example of a hybrid network is shown in FIG. 1. One UE can choose either the cellular mode or the direct device-to-device transmission (D2D) mode to achieve a high total system performance. Basically, in such a hybrid network, critical problems mainly occur from resource sharing and interferences present in the system.

In addition to the licensed spectrum, after the digital television (DTV) deployment, there will be typically a number of TV channels in a given geographical area that are not being used by the DTV broadcast because of frequency reuse. However, a transmitter operating on such a locally vacant TV channel with a much lower power level would not need a large location separation from co-channel and adjacent-channel TV stations to avoid interference to be occurred. Relatively low-power devices can therefore operate on these vacant channels, which can be called as TV White Spaces (TVWS).

IEEE specification 802.11 covers WLAN implementations also known as brand name WiFi. The 802.11 further predefines the radio resource partition. The position and bandwidth of the carriers used by the WiFi system is fixed. This resource partition method is suitable for ISM (Industrial, Scientific and Medical) bands because there is not much spectrum competition between different systems and the usable spectrum for the 802.11 systems is stable. But the position and bandwidth of the usable spectrum in TVWS is probably unstable, and sometimes the available spectrum is fragmentary. The fixed predefined system carrier and bandwidth is not suitable for the D2D communication on TVWS bands. As shown in FIG. 2, there are enough spectrum resources for the 802.11 systems, but they cannot be used by the 802.11 systems because of the problem caused by the fixed carrier definition.

IEEE specification 802.22 discloses a standard for Wireless Regional Area Networks (WRAN) using TV White Spaces spectrum. The radio resources used in the 802.22 system are defined after spectrum sensing. The terminals in the 802.22 system periodically report the local information of the usable spectrum after the sensing. The base station defines the spectrum used by the system based on the reported information from the terminals in the cell. In contrast with the 802.11 systems, this resource utilization method can adapt to a condition of variable spectrum. But the sensing-report-decision mechanism can only work in a slowly varying environment rather than a highly dynamic one, which is probably the case of open White Spaces spectra. On the other hand, terminals may sense different available spectrum gaps under severe competition situation. The base station just defines the common spectrum as the system's frequency based on the sensing results of different terminals, which will decrease the efficiency of the resource utilization. An important advantage of D2D communication is that it can reuse the radio resources in a way similar as the Space-division multiple access (SDMA) system does, since the D2D links are usually short haul and the transmission power is low. Thus, it is clear that the channel defining method of the 802.22 system is not good enough for the D2D communication on the TVWS band either.

The resource partition mechanisms of IEEE 802.11 and 802.22 systems are both unsuitable because they cannot work well in a highly competing environment and they cannot use highly varying spectrum efficiently either. The advantages of the D2D communication, such as short haul links and low transmitting power, are not utilized very well. These two methods are not flexible and efficient enough for the D2D communication on the TVWS bands.

As yet another prior art system, a Carrier Sense Multiple Access with Collision Avoidance (CSMA/CA) is a system where absence of other traffic is verified through carrier wave sensing (actually, a lack of any received signal detected by the receiver) before a transmitting node starts its transmission on the shared medium. The collision avoidance means that if the channel is sensed as busy before the transmission, then the transmission is deferred for a random interval. CSMA/CA with RTS/CTS (Request to send/Clear to send) functionality is meant for spectrum resource sharing and contention among users in a distributed and asynchronous network, such as WiFi. Before any resource competition for the data transmission, transmitters must sense the channel condition. Only after the channel has been idle for at least the duration of DIFS (Distributed coordination function InterFrame Space), it can send the RTS message to the receiver as a request for setting up the communication. During the subsequent procedures, data transmission is sent until the channel has been idle for the period of SIFS (Short InterFrame Space).

The advantage of the above is that it can resolve the data collision between users in the distributed network.

The disadvantage of the same is that in the CSMA/CA mechanism, the signaling including RTS, CTS and ACK (acknowledgement message) uses the same channel resources as the data transmission. Thus, the data and the signaling cannot be transmitted simultaneously. In CSMA, it is very important in carrier sensing to reduce the possibility of collisions, but however, in sensing time periods DIFS and SIFS, data transmission is impossible. All these requirements will degrade the utilization efficiency of the spectrum resources.

White Spaces (WS) spectra such as the Television White Spaces can be provided available to lots of different communication systems, including many other systems than just the WiFi. This means that the resource contention in WS spectrum may be quite intensive and spectrum fragments will widely exist. It is well known that the CSMA/CA mechanism cannot work efficiently in an intensive competition environment. Furthermore, the widely-existing and dynamic spectrum gaps will make the problem even worse since a communication pair based on CSMA/CA could hardly find out resources for communication. FIG. 3 is an illustration of such a case, where the spectrum gaps are either too narrow in the frequency domain or too short in the time domain for a CSMA/CA communication. It is obvious that conventional CSMA/CA systems cannot adapt to the dynamical environment and furious competition of the open White Spaces spectra, and thus, the spectrum utilization is consequently low.

Going back to the IEEE 802.22 concerning to Wireless Regional Area Networks (WRAN), 802.22 discloses a standard for cognitive radio based wireless communication for license-exempt devices in TVWS, with a basic requirement of no harmful interferences to the incumbent. Each communication link is set up between the user and the Base Station (BS), and the radio resource allocation is totally under the control of the BS.

The advantage of IEEE 802.22 is that based on cognitive radio technology, WRAN can settle resource contention to a certain extent and protect the incumbent.

The disadvantage of IEEE 802.22 is that, as shown in FIG. 2d, WRAN is an infrastructure based system just like a traditional cellular system. All the communication needs forwarding of the BS and there is no consideration on how to set up D2D communications for users in the vicinity. As the TVWS spectrum is open, there could be a number of heterogeneous systems sharing the spectrum resources. The radio resource sharing and contention among different systems results in a challenge that available resource could be quite dynamic and fragmental in all the space, frequency and time domains. This challenge cannot be settled in IEEE 802.22 systems effectively since the resource allocation is performed by the BS, which cannot trace the variations of the radio environment in a local area.

In the following, emerging problems of the above covered issues are discussed.

In traditional LTE and LTE-Advanced systems, the carriers' locations are well defined and broadcast in the whole network. D2D UEs can get the same information and take advantage of this to achieve D2D communications through radio resource sharing and reuse the spectrum with cellular UEs. However, In TV white spectrum bands, there is no channel partition specified. Therefore, it is hard for D2D UEs to communicate with each other since they do not even have common knowledge of the channels' frequency position.

There are several further problems considering the D2D communication on the TVWS.

At first, D2D users can hardly communicate with each other on TVWS bands because there is not any channel or radio resource partition specification for D2D communication. Even if the D2D users sense the same white space spectrum, they cannot communicate with each other because they have no common knowledge on the resource partition.

Secondly, different from the licensed spectrum, there could be many users or systems that will compete for the spectrum in TVWS bands. It may result in highly variable usable spectrum and lots of little spectrum fragments. When designing the channel and resource partition method for D2D communication, these two features of TVWS should be considered carefully to help D2D users to use TVWS band more flexibly and efficiently, and improve the system performance and spectrum efficiency.

Thirdly, one assumption of D2D communication scenario is that the D2D user can get assistance information from the LTE/LTE-Advanced eNodeB. Therefore, another problem is that the designing of channel and resource grid partition method needs considering the compatibility between D2D communication and LTE/LTE-Advanced systems. The compatible design can lower the hardware complexity of the D2D terminals, and it is good preparation for the research on the LTE/LTE-A system working in TVWS bands.

There are further some challenges when operating D2D communication on TVWS.

TVWS are open to all systems on a condition that the incumbents should be well protected, thus there will be a large number of D2D links. Besides competition from other D2D links, D2D UEs also confront resource contention from heterogeneous systems, such as WiFi and IEEE 802.22, causing that the radio environment of D2D links dynamically varies.

Therefore, there is a need for an efficient resource contention solving and resource sharing method for a large number of device-to-device UEs.

SUMMARY OF THE INVENTION

According to a first aspect of the present invention, it introduces a method for resource sharing between device-to-device users, where user terminals are capable of utilizing white space bands. The method comprises obtaining frequency and timing synchronization with adjacent device-to-device user terminals, through at least one of downlink and uplink synchronization with a base station operating in licensed bands, and wherein the user terminal receives a primary or secondary synchronization signal from the base station in order to achieve frequency and timing synchronization with other user terminals.

In an embodiment of the invention, the method further comprises setting a virtual central frequency as a reference of radio resource grid partitioning for device-to-device communication, configuring size of a resource block set by the base station, comprising plurality of resource blocks, a resource block set being a partitioning unit of a two-dimensional radio resource grid regarding time and frequency, and partitioning the radio resource grid between used, free and unusable radio resources of at least one communication system.

In an embodiment of the invention, the configured size is based on interferences by other communication systems or external sources, and available frequency bands.

In an embodiment of the invention, the method further comprises dividing each resource block set in an available radio spectrum into a device-to-device common control channel and a device-to-device data channel.

In an embodiment of the invention, the method further comprises letting at least two user terminals to compete for free radio resources using the common control channel of at least one resource block set, and giving to a user terminal a permission to transmit when a clear-to-send information is correctly received by that user terminal.

In an embodiment of the invention, the method further comprises sensing usage of the spectrum by the user terminal when the user terminal is idle, informing the sensed spectrum usage with other user terminals in order to enable sharing the radio resources as distributed locally between different device-to-device communication links, and feeding back the sensed information to the cellular network for reconfiguring the size of resource block sets.

In an embodiment of the invention, the available radio spectrum comprises White Space frequency bands such as Television White Spaces and Industrial, Scientific and Medical (ISM) frequency bands.

In an embodiment of the invention, the control channel of the resource block set comprises a ready-to-send, a clear-to-send, data control information and acknowledgement information sub-channels.

In an embodiment of the invention, the method further comprises the ready-to-send sub-channel comprises a transmission requirement message from a transmitting user terminal to a receiving user terminal, comprising ID data for both terminals, the clear-to-send sub-channel comprises a response message from the receiving user terminal to the transmitting user terminal on at least one resource block set, sent if no transmission requirement message conflict exists in the receiving user terminal and the corresponding resource block sets are applicable for use, the data control information sub-channel comprises at least one of data format and buffer size, and the acknowledgement information sub-channel comprises information whether the data transmission is acknowledged (ACK) or not (NAK).

In an embodiment of the invention, in a single resource competition, the data is sent between the transmitting user terminal and the receiving user terminal in the following order: the transmission requirement message, the response message, the data control information, the data and the acknowledgement information.

In an embodiment of the invention, further in case of a used frequency band is noticed overcrowded by the sensing, shifting the used frequency band without negotiating with other user terminals so that at least one resource block set overlaps between the shifted and unshifted frequency bands.

In an embodiment of the invention, further in case of a used frequency band is noticed overcrowded by the sensing and a free frequency band is non-overlapping with the used frequency band, transferring the used frequency band to the free frequency band through a new resource competition procedure.

According to a second aspect of the invention, a user terminal is introduced for resource sharing between device-to-device users. The user terminal is capable of utilizing white space bands, and it comprises a processor configured to obtain frequency and timing synchronization with adjacent device-to-device user terminals, through at least one of downlink and uplink synchronization with a base station operating in licensed bands, and wherein further configured to receive a primary or secondary synchronization signal from the base station in order to achieve frequency and timing synchronization with other user terminals.

In an embodiment of the invention, the processor is further configured to set a virtual central frequency as a reference of radio resource grid partitioning for device-to-device communication, configure size of a resource block set by the base station, comprising plurality of resource blocks, a resource block set being a partitioning unit of a two-dimensional radio resource grid regarding time and frequency, and partition the radio resource grid between used, free and unusable radio resources of at least one communication system.

In an embodiment of the invention, the configured size is based on interferences by other communication systems or external sources, and available frequency bands.

In an embodiment of the invention, the processor is further configured to divide each resource block set in an available radio spectrum into a device-to-device common control channel and a device-to-device data channel.

In an embodiment of the invention, the processor is further configured to let the user terminal to compete with at least one other user terminal for free radio resources using the common control channel of at least one resource block set, and start the user terminal transmission when a clear-to-send information is correctly received by the user terminal.

In an embodiment of the invention, the processor is further configured to sense usage of the spectrum when the user terminal is idle, inform the sensed spectrum usage with other user terminals in order to enable sharing the radio resources as distributed locally between different device-to-device communication links, and feed back the sensed information to the cellular network for reconfiguring the size of resource block sets.

In an embodiment of the invention, the available radio spectrum comprises White Space frequency bands such as Television White Spaces and Industrial, Scientific and Medical (ISM) frequency bands.

In an embodiment of the invention, the control channel of the resource block set comprises a ready-to-send, a clear-to-send, data control information and acknowledgement information sub-channels.

In an embodiment of the invention, the ready-to-send sub-channel comprises a transmission requirement message from a transmitting user terminal to a receiving user terminal, comprising ID data for both terminals, the clear-to-send sub-channel comprises a response message from the receiving user terminal to the transmitting user terminal on at least one resource block set, sent if no transmission requirement message conflict exists in the receiving user terminal and the corresponding resource block sets are applicable for use, the data control information sub-channel comprises at least one of data format and buffer size, and the acknowledgement information sub-channel comprises information whether the data transmission is acknowledged (ACK) or not (NAK).

In an embodiment of the invention, in a single resource competition, the data is sent between the transmitting user terminal and the receiving user terminal in the following order: the transmission requirement message, the response message, the data control information, the data and the acknowledgement information.

In an embodiment of the invention, in case of a used frequency band is noticed overcrowded by the sensing, shifting the used frequency band without negotiating with other user terminals so that at least one resource block set overlaps between the shifted and unshifted frequency bands.

In an embodiment of the invention, in case of a used frequency band is noticed overcrowded by the sensing and a free frequency band is non-overlapping with the used frequency band, transferring the used frequency band to the free frequency band through a new resource competition procedure.

According to a third aspect of the invention, a computer program for resource sharing between device-to-device users is introduced. The devices are capable of utilizing white space bands, and the computer program comprises code adapted to perform the following steps, when they are executed on a data-processing system. These steps comprise obtaining frequency and timing synchronization with adjacent device-to-device user terminals, through at least one of downlink and uplink synchronization with a base station operating in licensed bands, and wherein the user terminal receives a primary or secondary synchronization signal from the base station in order to achieve frequency and timing synchronization with other user terminals.

In an embodiment of the computer program, it is further adapted to perform the steps of setting a virtual central frequency as a reference of radio resource grid partitioning for device-to-device communication, configuring size of a resource block set by the base station, comprising plurality of resource blocks, a resource block set being a partitioning unit of a two-dimensional radio resource grid regarding time and frequency, and partitioning the radio resource grid between used, free and unusable radio resources of at least one communication system.

In an embodiment of the computer program, the computer program is stored on a computer readable medium.

It is possible to combine one or more of the embodiments and aspects disclosed above to form one or more further embodiments of the present invention.

BRIEF DESCRIPTION OF THE DRAWINGS

The accompanying drawings, which are included to provide a further understanding of the present invention and constitute a part of this specification, illustrate embodiments of the invention and together with the description help to explain the principles of the present invention. The examples shown in the drawings are not the only possible embodiments of the invention and the present invention is not considered to be limited to the presented embodiments only. In the drawings:

FIG. 1 illustrates a hybrid network comprising cellular and device-to-device (D2D) networks, FIG. 2a illustrates carrier predefinition of the IEEE 802.11 system according to prior art, FIG. 6b illustrates a table of a control part format in a RBS, FIG. 7 illustrates an example of the transmission flow, FIG. 8 illustrates RTS and CTS messaging for the RBS competition.

DETAILED DESCRIPTION OF THE EMBODIMENTS

Figure 2B:
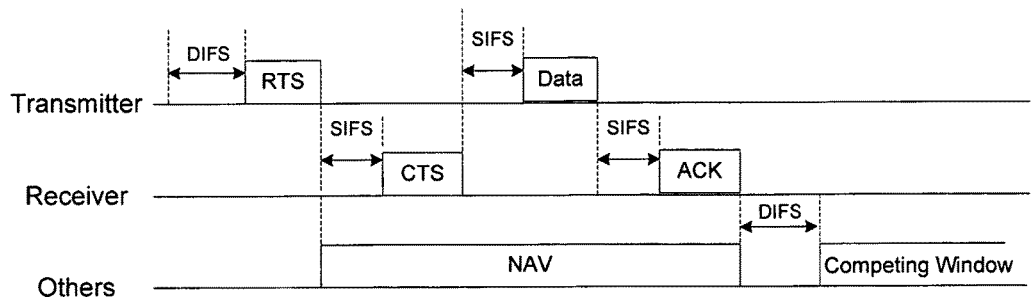
FIG. 2b illustrates carrier sense multiple access/carrier aggregation (CSMA/CA) scheduling diagram with clear-to-send/request-to-send (CTS/RTS) messaging according to prior art.
Figure 2C:
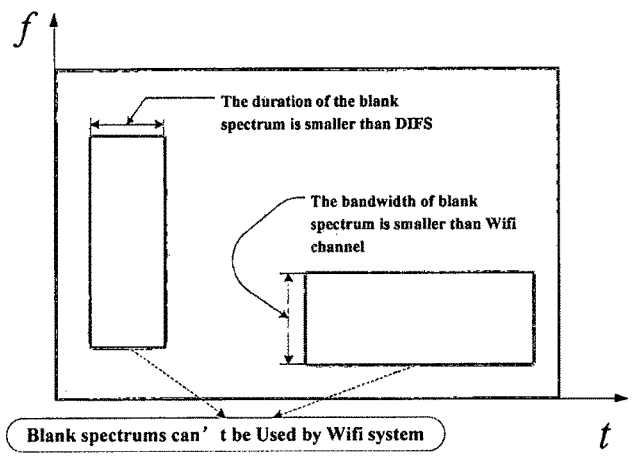
FIG. 2c illustrates a situation where a resource is available but unusable by WiFi.
Figure 2D:
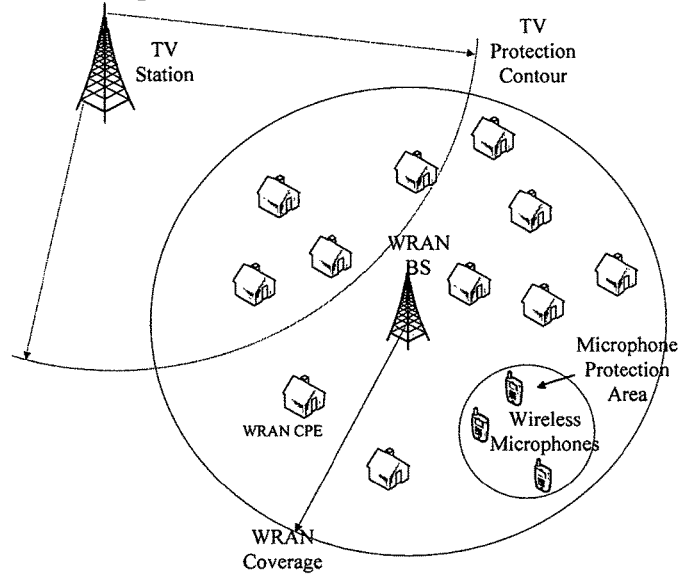
FIG. 2d illustrates an example of the system according to a standard for Wireless Regional Area Network (WRAN) using white spaces in the TV frequency spectrum (the IEEE 802.22 system)

Reference will now be made in detail to the embodiments of the present invention, examples of which are illustrated in the accompanying drawings.

The key issue in the present invention is to design and introduce a resource sharing and contention mechanism, which works efficiently among D2D (device-to-device) links. It is also covered in an embodiment how to achieve efficient resource utilization in case of coexistence scenario with other heterogeneous systems. The present invention aims to allow a large number of D2D links sharing radio resources in Television White Spaces (TVWS), while improving spectrum efficiency. Besides, the mechanism to be presented needs making the D2D links to have an ability to balance the D2D traffic to other vacant spectrum bands, when resources are no longer available due to intensive contention or by resumption of incumbent transmission systems.

The present invention addresses D2D communications in license-exempt TVWS bands and deals with a new mechanism to achieve effective channel partition for D2D User Equipment units (abbreviated as D2D UEs). It is useful for the D2D UEs to operate on such TVWS bands.

To accomplish the D2D communications in TVWS bands, a channel and resource grid partition scheme is needed. The present invention introduces a method, an apparatus and a computer program for sharing resources in device-to-device operation between UEs in a telecommunication network.

In general, frequency bands available for the communication between a terminal and a base station are either licensed specifically for given use or given service provider (such as for 4G mobile communication use, for instance), or the bands are unlicensed. Unlicensed bands (or license-free spectrum) mean frequency bands that have rules pre-defined for both the hardware and deployment methods of the radio. These technical rules are formed in such a manner that interference is mitigated by these rules defined for the bands, rather than the band being restricted for use by only one entity through a spectrum licensing approach.

In an embodiment of the invention, it is assumed that a base station (such as an eNodeB, abbreviated as an eNB) controls and allocates resources both in licensed and unlicensed spectra via carrier aggregation methods. This means that there is a primary component carrier (PCC) taking place on the licensed spectrum and additional secondary component carriers (SCCs) taking place on the licensed and/or the unlicensed spectrum.

In other words, LTE Advanced system concept (from 3GPP release 10 onwards) can deploy the unlicensed bands e.g. via carrier aggregation methods so that the devices and local access points have potential spectrum available to be used in opportunistic manner. This can be implemented as non-contiguous carrier aggregation controlled by the eNB in which unlicensed spectrum is used as a ground for secondary carriers or cells while the primary carriers or cells are using the licensed spectrum.

The present invention introduces a channel and resource grid partition method for the D2D communication in white space bands, such as in Television White Spaces. With such a method, the D2D users can get a common knowledge on the channel and radio grid partition in TVWS, and based on this method, the D2D communication can use the radio resources in TVWS bands efficiently.

In an embodiment according to a first aspect of the invention, the following steps are performed. It is to be noted that the features are added with clarifying issues which are not necessary for the relevant method steps.

1. Define a VCF (Virtual Central Frequency) for the D2D communication. The VCF can be defined by the base station and broadcasted to the D2D users, or it can be predefined for the D2D communication. The VCF provides the basis of the uniform partition of the spectrum for the D2D terminals.
2. After the frequency and timing synchronization, based on the common VCF, the BS configures the size of RBS (Resource Block Set) which is the basic resource partition unit of the radio resource grid on TVWS. With the configuration of the RBS, all D2D users get uniform knowledge of the radio resources.
3. Based on the information about the interference(s) and the free frequencies, the base station can adjust the size of the RBS semi-statically.
4. D2D users share the radio resources in TVWS bands with the RES as the basic resource unit. Without the limitation of the fixed defined carrier, all free radio resources can be utilized.
5. The VCF can be adjusted or optimized to reduce the number of bits in the D2D signalling for representing the locations of the radio resources. For example, in case of free resources crossing the multiple system carriers or TV channels, the RBs or RBSs indexed relative to the VCF are sufficient to identify the D2D resources whereas RB indices associated with the carrier number or the TV channel indices have to be used in the prior art typically with more bits and signaling. In particular, the VCF can be adjusted to a frequency, around where the most free frequency resources are located.

The resource blocks (RB) of the present invention can be determined as in the LTE specification, each RB having length of 1 ms and frequency band of 180 kHz.

According to a second aspect of the invention, a communication procedure between D2D UEs is introduced. The procedure is based on the technology of the LTE/LTE-Advanced, to solve problems of the resource contention and sharing among a large number of D2D UEs.

In an embodiment of the second aspect according to the present invention, the method comprises the following steps:

1. The D2D UE obtains frequency and timing synchronization with adjacent D2D UEs through the downlink (and uplink) synchronization with the base station (eNB) operating in licensed bands.
2. Based on the channel and radio resource partition with the VCF and the RBS definition by the BS, each RBS in White Space spectrum is divided into two channels: The D2D common control channel (D2D CCCH) including RTS, CTS, DataCtrl and ACK sub-channels, and the D2D data channel.
3. The D2D UEs compete for the radio resources in D2D CCCH of one or multiple RBSs, by which they can achieve spectrum sharing and contention. A transmitter starts its data transmission on the RBSs, when CTS messages are correctly received.
4. When the D2D UEs are idle, they can sense usage of the spectrum and coordinate with each other to adjust the resources of the D2D links locally in a distributed way.

5. The D2D UEs feed their sensing information back, comprising interference level, adjacent spectrum occupancy, contention intensity, to the eNB. The eNB will then semi-statically adjust the size of the RBS in a centralized way.

The present invention is not limited to be utilized only in LTE/LTE-Advanced based D2D communications, but it can be applied for all D2D terminals and systems based on OFDM technology.

The D2D communication can use SC-FDMA technology in LTE/LTE-Advanced uplink or OFDMA in LTE/LTE-Advanced downlink.

The present invention is not only suitable for the resource grid partition in TV White Spaces, but it can also be used as a resource partition solution in other White Space bands and e.g. ISM bands. Furthermore, the blank spectrum can be a single continuous spectrum or formed by several non-continuous spectrum bands.

Both transmission technologies of uplink (DFT-S-OFDM) and downlink (OFDMA) in LTE/LTE-Advanced can be used in the D2D communication which may relax the equipment hardware requirements and retain also better consistence. On the other hand, it could take advantage of both techniques. For example, if the blank spectrum resources are sufficient and the competition is not fierce, the D2D UEs can adopt the DFT-S-OFDM technology for transmission. Otherwise, the D2D UEs would better adopt the OFDMA technology.

The following assumptions are applied in an embodiment according to the first aspect of the invention.

The D2D terminals are there in the coverage of LTE/LTE-Advanced systems, and the D2D users can get the same information as the cellular terminals using the LTE/LTE-Advanced system. With this assumption, the D2D users could get the VCF and RBS configuration information from the eNB, and they can synchronize with each other through the PSS/SSS reception from eNB.

The D2D communication is compatible with LTE/LTE-Advanced systems. The first assumption requires that the D2D terminals have the ability to communicate with an eNB in the LTE/LTE-Advanced systems. Compatibility between the D2D communication and the LTE/LTE-Advanced systems can lower the complexity of the D2D terminals, and it is beneficial for the D2D terminals to get the assistance information from eNB.

The following assumptions are applied in an embodiment according to the second aspect of the invention.

The D2D UE is in the coverage area of the LTE/LTE-Advanced system and it can acquire at least the same information as a normal UE does.

Further, the D2D UE can demodulate the synchronization reference signals (PSS/SSS) and broadcast messages in the LTE/LTE-Advanced system. Also, the D2D UE can get assistance control from the eNB by demodulating control and/or broadcast channels of the LTE/LTE-Advanced system.

Furthermore, the transmission between the D2D UEs should be as compatible as possible with the LTE/LTE-Advanced system. The definition of the sub-carriers and the RB maintains the same as in the LTE/LTE-Advanced system. Further, the configuration of a subframe structure maintains the same as in the LTE/LTE-Advanced system. Demodulation reference signals maintain also the same as with the LTE/LTE-Advanced system. Furthermore, the LTE/LTE-Advanced systems still work in licensed bands, and not in the White Spaces spectrum bands.

In the first aspect of the invention, the frequency and timing synchronization among the D2D users is performed as in the following.

Through receiving the PSS/SSS from the eNodeB of the LTE/LTE-Advanced system, the D2D terminals can get the frequency and timing synchronization with the eNB. Since the mutual distance between D2D terminals is usually short, the synchronization between the D2D terminals and the eNB can guarantee the basic synchronization among different D2D terminals.

It is to be noted that the synchronization based on the PSS/SSS reception is enough for the D2D communication using OFDMA, the downlink transmission technique. If the DFT-SOFDMA is used as the transmission technique for the uplink, the D2D terminals can achieve further synchronization through random access with the eNB.

In the second aspect of the invention, the frequency and timing synchronization is performed as in the following.

The D2D UE acquires the downlink frequency and timing synchronization by detecting and demodulating the PSS and SSS signals of the cell. Through synchronization, the neighboring D2D UEs can launch synchronous resource competition, which is different from the asynchronous contention in CSMA/CA. The OFDM signals of different D2D UEs stay orthogonal with each other and no so-called guard bands (GB) are needed.

It is to be noted that the synchronization based on the PSS/SSS reception is enough for the D2D communication with OFDMA, the downlink transmission technique. If the DFT-S-OFDMA is used as the uplink transmission technique, the D2D terminals can get further synchronization through random access with eNB, as in the first aspect according to the invention.

The definition of the virtual central frequency (VCF) is done according to the following, in one embodiment of the invention.

It is notable that the VCF does not mean a real central frequency of any channel or carrier. The definition of the VCF just provides a basis for the common channel and radio resource grid partition in the TV White Spaces bands. The VCF can be defined by the eNB, and then it can be broadcast to the D2D terminals under the coverage of the eNB. It can also be predefined by the system operator and written in the SIM/USIM cards of the D2D terminals.

The channel and radio resource grid partition in White Spaces spectrum is performed as in the following, in one embodiment of the invention.

Figure 3:
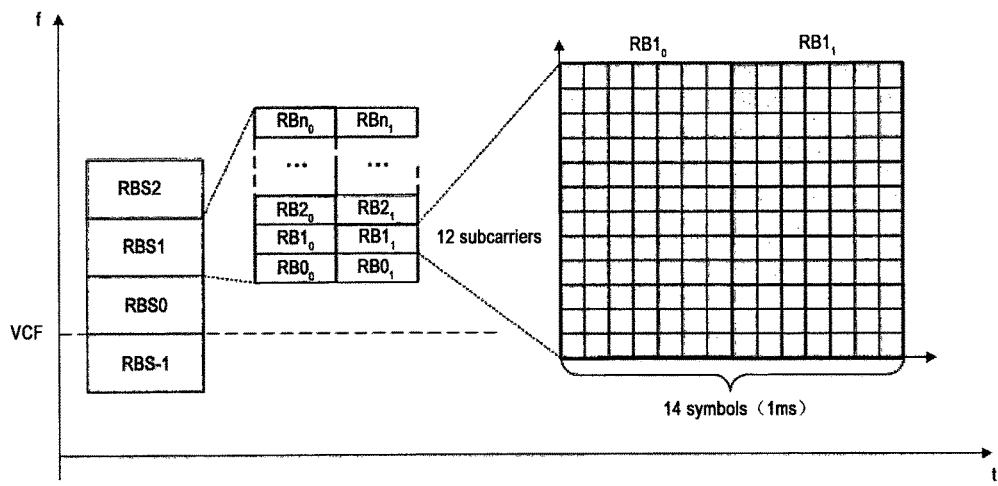
FIG. 3 illustrates an example of the channel and radio resource grid partition mechanism according to an embodiment of the invention.

Based on the definition of the VCF, channel and radio resource grid partition can now be considered. To maintain the compatibility between the D2D communication and the LTE/LTE-Advanced systems and to achieve better efficiency and flexibility compromise, the resource block set (RBS) is defined as the basic radio resource grid unit for resource sharing of the D2D communications in the TVWS bands. FIG. 3 shows an example of the channel and radio resource grid partition mechanism. Based on the VCF and the resource partition method in the LTE/LTE-Advanced systems, the eNB can define subcarrier, the RB and the RBS. To maintain the consistency, the definition of the subcarrier and the RB here is the same as in the LTE/LTE-Advanced system. In frequency domain, each RBS contains n pieces of RBs, where n (an integer equal or larger than 1, deciding the size of an RBS) is defined and broadcast by the eNB. In time domain, each RBS lasts 1 millisecond which is the length of 2 RBs.

With this channel and resource grid partition mechanism, the D2D communication uses the same sub-frame structure as the LTE/LTE-Advanced systems. Because the D2D users can achieve frequency and timing synchronization with each other, the radio resources' grid definition of different D2D links is aligned in both frequency and time domains, based on this mechanism. Since there is no definition of the system carrier and radio resources are further aligned in frequency and time domains, there is no need for guard bands (GB) among different D2D links, which is different as in conventional LTE/LTE-Advanced systems. This means that the spectrum resources in the TVWS bands can be utilized more efficiently.

Figure 4:
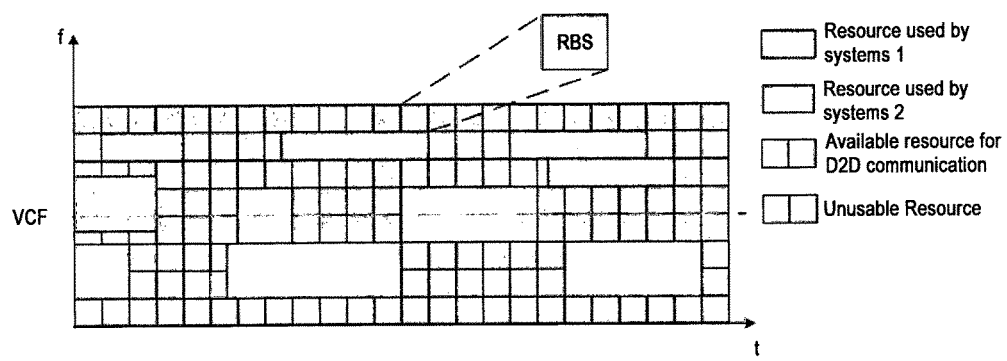
FIG. 4 illustrates a resource utilization principle based on a resource block set (RBS)

The resource sharing among the D2D links is covered next. Based on the radio resource grid partitioning method, D2D links can share radio resources in a very flexible way. With the RBS as the basic radio resource grid unit in the resource utilization, which can be much smaller than a normal LTE/LTE-Advanced carrier, the white spectrum fragment can be utilized efficiently. On the other hand, the mechanism can work well in highly competing environments where the available resources changes dynamically since the length of an RBS is only 1 ms. As shown in FIG. 4, the channel and radio resource grid partitioning method improves the flexibility and efficiency of the resource utilization significantly.

The RBS size configuration is discussed in the following. The eNB can semi-statically configure the size of the RBS, and the configuration information will be broadcast to D2D users. The D2D users sense the TVWS radio environment, such as e.g. interference level and utilization ratio, in a periodic or event-triggered way. The sensing information will be sent to the eNB. According to the information about new available spectrum bands and the interference level, the eNB can reconfigure the size of the RBS to satisfy different communication requirements. Furthermore, the RBS can be configured with different sizes for different frequency bands if needed. If the interference level is quite high and the competition is intensive in a certain WS spectrum band, then the RBS size can be configured smaller to support more D2D links and higher flexibility. Otherwise, the RBS size can be enlarged to improve efficiency. The RBS configuration can help achieving good trade-off between efficiency and flexibility.

The following table is an example of an RBS configuration message. It is to be noted that the RBS size can also be configured or reconfigured on the whole WS spectrum, and not just for specific bands and sub-bands.

Table 1 shows an example of an RBS configuration/reconfiguration message.

| TVWS band | RBS size (n) |
|---|---|
| Band 1 | 1 |
| Band 2 | 6 |
| Band 3 | 2 |

Figure 5:
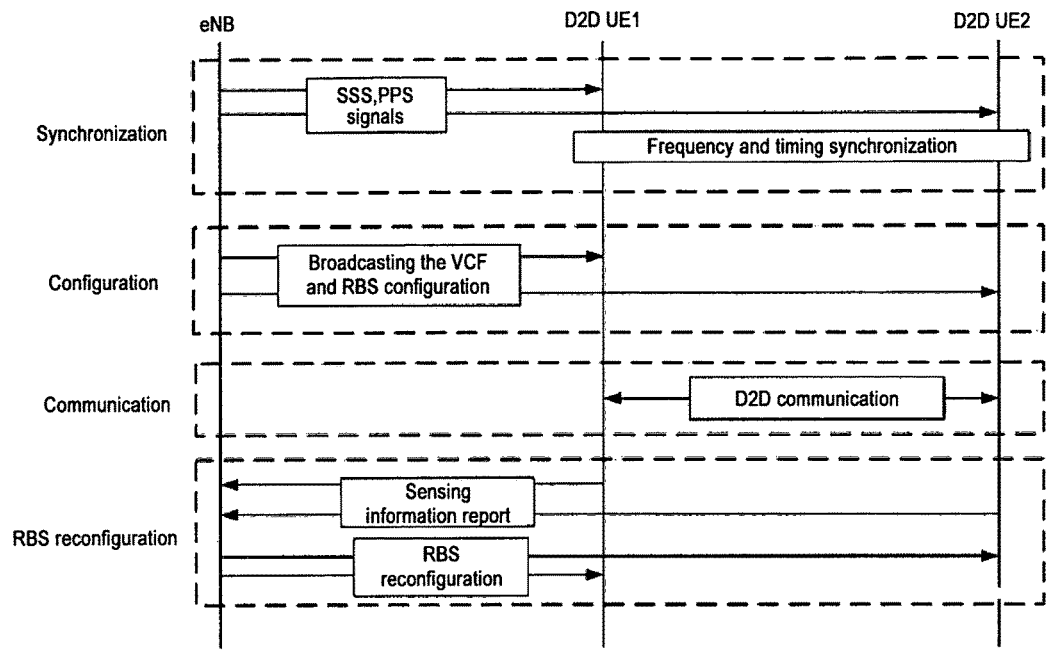
FIG. 5 illustrates the resource grid partition process flow according to an embodiment of the invention.
Figure 6A:
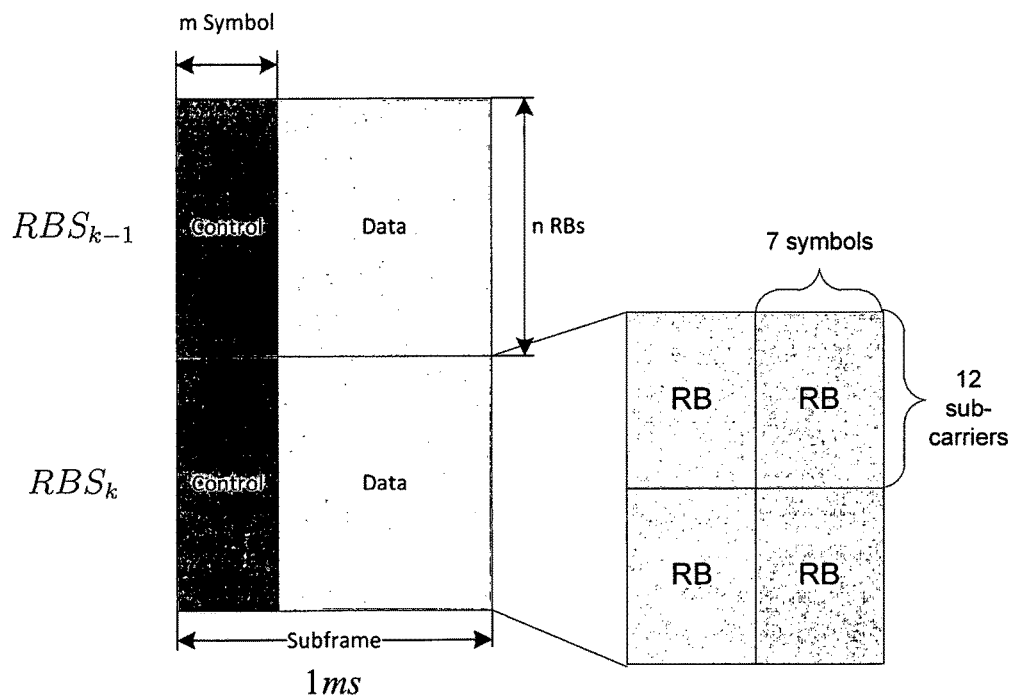
FIG. 6a illustrates an RBS schematic diagram according to a second aspect of the invention.

Regarding signalling procedures, FIG. 5 shows a process flow, in one embodiment of the invention. The process steps have already been disclosed above.

Advantages of the first aspect of the present invention comprise the following issues:
1. Based on the VCF definition and the RBS configuration, the mechanism can help D2D users to achieve common knowledge of the radio resources in the WS spectrum.
2. The D2D communication with the RBS as the basic radio resource grid unit makes the spectrum utilization quite efficient. The usage of the radio resources is very flexible and efficient. It is also suitable for the situation, where there is intense competition for the radio resource(s).
3. The RBS is aligned in both frequency and time domain, and thus, no guard bands between different D2D communication links are needed, which makes the spectrum utilization ratio even higher.
4. The RBS configuration based on sensing the information report can achieve good trade-off between efficiency and flexibility.
5. This resource grid partition method is highly compatible with the LTE/LTE-A systems, which means that the basic transmission techniques of LTE/LTE-A do not require any changes, and further, the requirements concerning the D2D terminal hardware are lowered.
6. The present invention is also applicable to other systems based on the OFDM technology and also to other WS spectrum including e.g. the ISM bands.

Going back to the invention according to the second aspect, the common control channel and data channel in the RBS are organized as follows, in one embodiment of the second aspect. The frame structure used by the D2D transmission is almost the same as in the LTE/LTE-Advanced:

The interval of sub-carriers is 15 kHz.
Sub-frame length is 1 ms and the symbol length is the same as the LTE/LTE-Advanced symbol.
CP length configuration is the same as in the LTE/LTE-Advanced system.
The definition of the RB is also the same as in the LTE/LTE-Advanced system.

After the resource grid partition (referring to the above), the TV white spectrum has been divided into a number of radio resource grids and the minimal scheduling granularity is the RBS, which contains several RBs during a time of a sub-frame length. In each sub-frame, the resource for the common control channel (D2D CCCH) and the data channel (D2D SCH) are separated in time domain. The first m symbols (or even more if necessary) are used for the control purposes, and the other symbols are used for data transmission (m is defined by an LTE/LTE-Advanced eNB, which is related to n). Further, in frequency domain, each RBS has its own control channel for resource sharing and competition.

It is to be noted that although the D2D CCCH and D2D SCH could also be separated in frequency domain, the separation in time domain is rather performed. Still, either domain or even both domains together may be used.

Thus, the RBS is divided into two channels, D2D CCCH and D2D SCH. D2D CCCH contains several sub-channels responsible fox the resource sharing and competition. D2D SCH on the other hand bears data transmission. The following remarks give further details about the design of the D2D CCCH.

D2D CCCH can be divided into four sub-channels: RTS, CTS, DataCtrl and ACK.

RTS is the transmission requirement message from the D2D transmitter UE (TxUE) to the D2D receiver UE (RxUE), which includes information of TxUE ID and RxUE ID. To reduce the number of transmitted bits, the content can be a modulo operation result of these two data. To avoid coincidence of the same modulo result between two D2D couples, a random value negotiated during the link setup, can be also introduced in the modulo process. Further, the random value can be increased by 1 in each RTS.

CTS is the response message from the RxUE to the TxOE, and only if no RTS conflict is detected in the RxUE and this RBS is appropriate for use. The CTS message includes TxUE ID and RxUE ID. Similarly as for the RTS, the CTS will be sent back to the TxUE only on the RB/RBS, where there is no RTS conflict.

DataCtrl shows the data format and other information. It can either show e.g. a buffer size. Utilized resource information is not needed any more since only the resources with successful CTS will be used. However, such resource information can also be added if necessary.

ACK is the acknowledgement information (ACK/NACK; ACK=ok, NACK=not ok) of the data transmission.

It can be noted that some back-off algorithm can be introduced to reduce conflicts and improve efficiency at this stage. Some other information, such as channel condition, sensing results and/or power control for instance, can also be added in the control channels.

In the second aspect of the invention, the resource competition and sharing is performed in one embodiment as follows. An example of the communication procedure is shown in FIG. 7. It is similar to a conventional RTS/CTS procedure, but in a synchronous way.

A D2D UE can initialize the competition on multiple RBSs, which are either contiguous or non-contiguous. The target D2D UE will respond only on the RBSs, where there is no RTS conflict, and the D2D UE can initialize the competition in the next turn for different RBSs.

The steps of the resource competition and the data transmission in this embodiment are as follows:

1. The TxUE sends an RTS to the RxUE. The number of RBSs initiated by the competition depends on the transmission speed, competition strategy and the radio environment. For example, to have some margin in order to avoid any competition failure, the TxUE may send the RTS on larger number of RBSs than the resource needed to launch competition.

2. The RxUE listens to the RTS in multiple RBSs to monitor the data transmission requirement from the TxUE. RTS signals may collide at the receiver of the RxUE, which makes the corresponding RBS not available for data transmission in a certain sub-frame. The RxUE responds to the TxUE with CTS on those RBSs, which are clear for use.

3. The TxUE will receive CTSs on all of or some of the RBSs, where the competitions are successful. The RxUE will send a NACK, when transmission failure occurs and the TxUE needs to retransmit the data. If the transmission is successful, the RxUE will send the ACK response to the TxUE.

4. The TxUE will initiate resource competition and data transmission in multiple sub-frames until all data have been transmitted correctly. The specific sub-frames depend on the former contention condition (success or failure) and also on adopted back-off mechanism.

The timing relationships of the resource contention and data transmission in D2D CCCH and D2D SCH should be noted.

By taking advantage of the frequency and time synchronization among the D2D UEs, resource contention and data transmission in D2D communication in White Spaces spectrum could act in a synchronous way, as differently from the CSMA/CA of WiFi systems.

Figure 9:
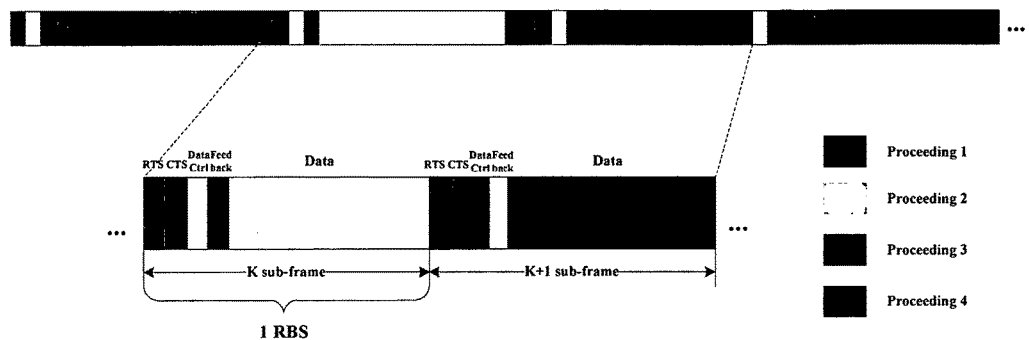
FIG. 9 illustrates an example of the timing relationship between two users.

FIG. 9 shows an example of a synchronous timing relationship in multiple resource contention and data transmission procedures. A specific grey shade means a complete procedure containing RTS, CTS, DataCtrl, data transmission (in D2D SCH) and ACK/NACK. The timing relation (time intervals between RTS/CTS/DataCtrl/DataTransmission/ACK) is predefined by operators, or configured by an LTE/LTE-A system.

The current method of resource competition and sharing has the following advantages. Through synchronous resource competition, the D2D transmission can utilize the spectrum more efficiently than the traditional CSMA/CA because no DIES or SIFS is needed any longer. Furthermore, the resource competition is based on RBSs in each sub-frame, and the D2D UE transmits data on the RBSs competed successfully. It provides high flexibility for the D2D communication. The spectrum fragments in space, frequency and time domains, caused by intensive resource sharing, can be utilized efficiently.

Spectrum transference in the D2D communication is discussed next. When it is found out that the current spectrum band is overcrowded, a D2D UE can adjust the communication band through consultation with its partner. If the movement in frequency domain is small, the D2D UE only needs to slide from the present location of the spectrum just slightly. If the D2D UEs find out that there is a new blank band, which is better than the present one, they can change to the new spectrum location and quit the spectrum they are currently using.

The specific procedure regarding this embodiment of the invention is listed below:

At first, the D2D UEs sense the spectrum either periodically or as event-triggered in a wide range. When the D2D UE finds out that the present spectrum is overcrowded and there are some other available blank spectrum bands, it can transfer to a better spectrum location. Both spectrum shifting and transference are supported.

Secondly, if an adjacent spectrum band is better for the D2D communication, the D2D UE (either the TxUE or RxUE) could slide to the interested spectrum band slowly, with no negotiation needed. The slow sliding in frequency domain can guarantee that there are always some RBSs used in the current communication which are the same as the former one. The communication can be performed continuously, and thus, there are no temporary gaps. Thus, the sliding requirement and acknowledgement messages need to be exchanged together with the data transmission. This procedure is called here as "Spectrum Shifting" as shown in part A of FIG. 10.

Figure 10:
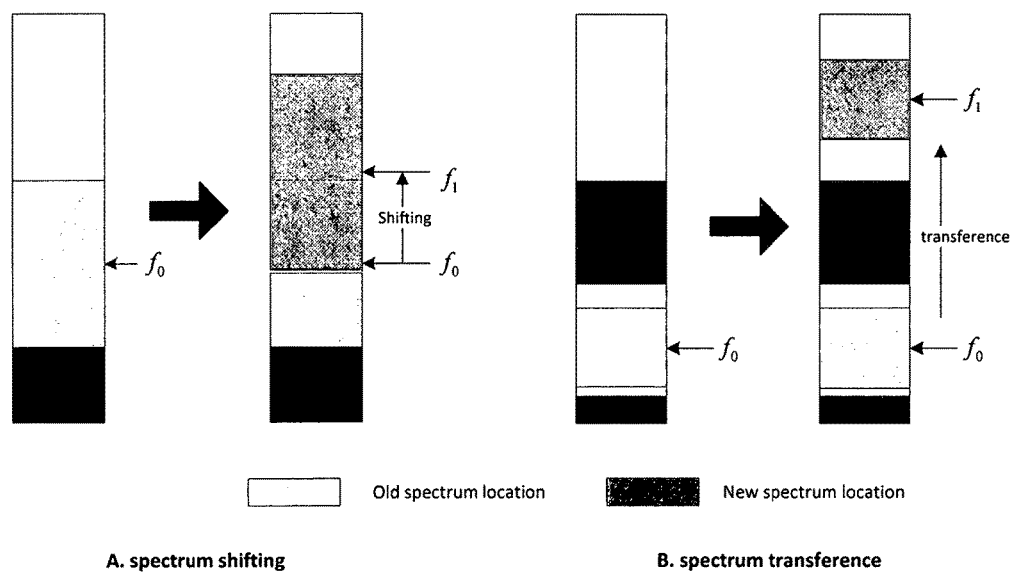
FIG. 10 illustrates spectrum shifting and spectrum transference in D2D communication.
Figure 11:
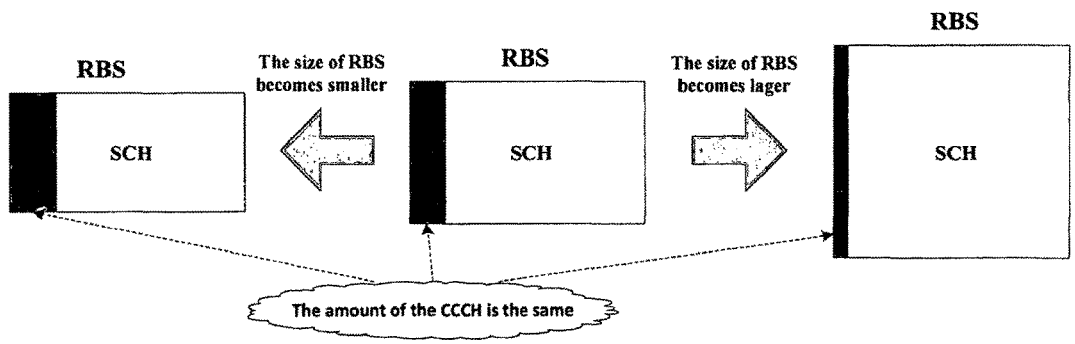
FIG. 11 illustrates an adjustment of the Common Control Channel (CCCH) according to the change of the RBS's size.

Thirdly, if the interesting spectrum band is relatively far from the presently used spectrum, a pair of D2D UEs needs to be changed to the new spectrum in a way called "Spectrum Transference" as shown in part B of FIG. 10. The negotiation between the D2D UEs is necessary. Usually, there will be a gap in data transmissions since the transmission in the old spectrum needs to stop first and then the new spectrum can be utilized. The negotiation content usually comprises the location of the new spectrum and the starting time of the new contention and the data transmission.

The advantage of the spectrum transference is that the D2D transmission can adapt to variable spectrum conditions. It achieves adaptive distributed spectrum load balancing, which will maximize the efficiency of spectrum utilization and improve the quality of service (QoS) of the D2D communications.

In the following, the RBS and CCCH adjustment based on the D2D UE sensing is discussed.

The size of the RBS and the CCCH is configurable according to the interference level, the available spectrum volume and the intensity of the resource competition. For example, if there are a few D2D UEs in the region and the communication between them is stable high speed transmission, it is better to use larger n (RBS size) and smaller m (CCCH size). On the contrary, if there are a lot of D2D UEs in the region and they have fierce competition for resources, using smaller n and larger m is a wise choice. To use spectrum resources more efficiently, an eNB should adjust the size of the RBS and the CCCH adaptively according to the level of competition and interference.

In other words, D2D devices sense spectrum periodically or temporarily (as event-triggered), and they feed the sensing result back to the eNB. The eNB adjusts the size of the RBS and the CCCH dynamically according to the statistical analysis of the sensing results.

It is to be noted that the statistical result should reflect the quantity of the blank spectrum and the level of competition. We define an exemplary indicator as in the following:

$$\eta = \frac{\eta_{successful\ RBS\ competition}}{\eta_{all\ RBS\ competition}}, \quad (1)$$

where $\eta_{successful\ RBS\ competition}$ is the number of RBSs on which a UE has competed successfully, and $\eta_{all\ RBS\ competition}$ is the number of RBSs on which the UE has launched competition. The D2D UE should feed the number of RBSs for competition and the value η back to the eNB. The eNB will adjust the sizes of the RBS and the CCCH according to the information of the different UEs.

The sizes of the RBS and the CCCH can thus be semi-statically configured and they can be comprised in the broadcast message. D2D UEs need to monitor the broadcast message of the cell periodically.

It can be noted here that if the D2D UE can provide the location information, the eNB can employ even more meticulous methods such as schemes based on location or based on D2D UE groups.

The presented method according to the second aspect of the invention has following advantages. At first, the eNB can adjust the sizes of the RBS and the CCCH according to the level of competition and interference, which can be used to achieve balance between competition costs and flexibility. Secondly, if the D2D UEs can provide location information, the method will be even more efficient through regulation of the RBS size based on the region or the D2D UE groups.

Figure 12:
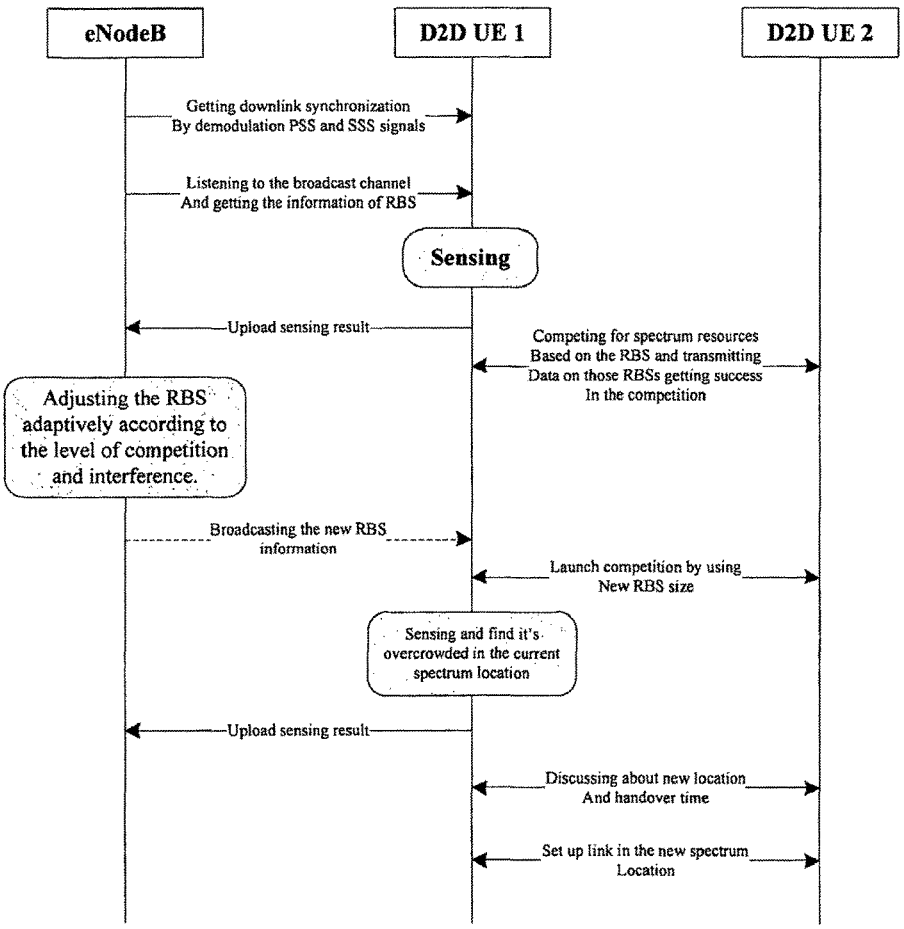
FIG. 12 illustrates an example of the D2D communication flow for TV White Spaces.

A D2D communication flow in TVWS bands is illustrated in FIG. 12 which shows a process flow according to an embodiment of the present invention. The steps of the process flow have already been discussed above in detail.

There are several advantages by employing the resource sharing and competition method according to the second aspect of the invention, covered above in detail. At first, the presented mechanism has good compatibility with the LTE/LTE-Advanced system for adopting consistent radio transmission technology in the D2D transmission. Furthermore, the RBS frame structure is similar as in the LTE/LTE-Advanced systems. Secondly, since resource competition among D2D UEs is performed synchronously, there is no need to wait for an idle time for DIFS/SIFS before the transmission, which is more efficient comparing to the traditional CSMA/CA procedure. Thirdly, as the resource contention is performed on each RBS independently, the D2D UEs can transmit data on the RBSs, on which the RTS/CTS competition completes successfully. Thus, this mechanism is able to adapt to intense competition situation on the white space spectrum bands. As a further advantage, distributed adaptive load balancing can be achieved to improve the spectrum utilization ratio through spectrum transference. Furthermore, based on the information about competition intensity and interference level, the BS can adjust the size of the RBS and the CCCH to compromise between overhead and flexibility. If D2D UEs can provide location information, the size of the RBS can be adjusted more meticulously in a specific area or for a specific D2D UE group, which results in a further improvement of spectrum efficiency. As yet another advantage, the presented mechanism is applicable to other OFDM-based systems and also other WS spectrum bands comprising ISM frequency bands. Finally as a summary, a comprehensive and effective D2D resources contention and communication procedure in the white spaces has been disclosed.

The present invention is applicable to all 3GPP releases from release 10 onwards. It can therefore be applied to any currently used and future LTE releases supporting the mixed use of licensed and unlicensed frequency bands. The invention is also applicable to any other technologies which apply the use of licensed and unlicensed frequency bands.

A separate or an embedded control unit may perform the above mentioned method steps where applicable. In an embodiment, the apparatus comprises a memory, and at least one processor configured to execute applicable method steps according to the invention. Furthermore, the method steps according to the invention can be controlled and implemented through at least one computer program, which can be executed in at least one processor. In an embodiment, the method steps, different apparatus (eNBs and UEs) and the computer program(s) according to the invention can be implemented by at least one separate or embedded hardware module for an existing mobile communication system.

The computer program(s) can be stored on at least one computer readable medium. The medium can be, for example, a memory circuit, a memory card, a magnetic or an optic disk. Some functional entities may be implemented as program modules linked to another functional entity. The functional entities may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware arts. For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present invention.

The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical arts.

As stated above, the components of the exemplary embodiments can include computer readable medium or memories according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present invention are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

What is claimed is:

1. A method for resource sharing between user terminals in device-to-device communications, comprising:
    obtaining, at a user terminal, frequency and timing synchronization with adjacent user terminals, through at least one of downlink and uplink synchronization with a base station operating in licensed bands;
    receiving, at the user terminal, a primary or secondary synchronization signal from the base station to synchronize frequency and timing with the adjacent user terminals;
    establishing a device-to-device communication in a white space band;
    partitioning a radio spectrum for device-to-device communication into a radio resource grid including a plurality of resource block sets, the radio spectrum being the white space band; and
    dividing each resource block set of the plurality of resource block sets in a part of the radio spectrum that is available into a device-to-device common control channel and a device-to-device data channel,
    wherein the method further includes:
    setting a virtual central frequency as a reference for the partitioning of the radio spectrum for device-to-device communication into the radio resource grid;
    configuring a size of the resource block sets by the base station, the resource block sets comprising plurality of resource blocks, a resource block set being a partitioning unit of a two-dimensional radio resource grid of time and frequency corresponding to the radio resource grid; and
    partitioning the radio resource grid between used, free and unusable radio resources of at least one communication system.

2. The method according to claim 1, further comprising:
    causing the user terminal and at least one other user terminal to compete for free radio resources using the device-to-device common control channel of at least one resource block set of the plurality of resource block sets.

3. The method according to claim 2, wherein in a single resource competition between the user terminal and the at least one other user terminal, data is sent in the following order: a transmission requirement message, a response message, data control information, the data, and acknowledgement information.

4. The method according to claim 1, further comprising:
    sensing usage of spectrum by the user terminal when the user terminal is idle;
    providing the sensed usage of the spectrum to other user terminals to enable sharing of radio resources distributed locally between different device-to-device communication links; and
    feeding back the sensed usage of the spectrum to the base station for reconfiguring the size of the resource block sets.

5. The method according to claim 4, further comprising:
    in case of sensing congestion in a used frequency band, shifting the used frequency band without negotiating with other user terminals so that at least one resource block set of the plurality of resource block sets overlaps between shifted and un-shifted frequency bands; and
    in case of sensing congestion in the used frequency band and a free frequency band is non-overlapping with the used frequency band, transferring the used frequency band to the free frequency band through a new resource competition procedure.

6. A user terminal that shares resources with other user terminals in device-to-device communications, comprising:
    circuitry including a processor connected to a memory and configured to:
    obtain frequency and timing synchronization with adjacent user terminals, through at least one of downlink and uplink synchronization with a base station operating in licensed bands;
    receive a primary or secondary synchronization signal from the base station to synchronize frequency and timing with the adjacent user terminals;
    establish a device-to-device communication in a white space band, wherein a radio spectrum for device-to-device communication is partitioned into a radio resource grid including a plurality of resource block sets, the radio spectrum being the white space band; and each resource block set of the plurality of resource block sets in a part of the radio spectrum that is available is partitioned into a device-to-device common control channel and a device-to-device data channel, wherein a virtual central frequency is set as a reference for the partitioning of the radio spectrum for device-to-device communication into the radio resource grid;

a size of the resource block sets is set by the base station, the resource block sets comprising plurality of resource blocks, a resource block set being a partitioning unit of a two-dimensional radio resource grid regarding time and frequency corresponding to the radio resource grid; and the radio resource grid is partitioned between used, free and unusable radio resources of at least one communication system.

7. The user terminal according to claim 6, wherein the set size of the resource block sets is based on interferences by other communication systems or external sources, and available frequency bands.

8. The user terminal according to claim 6, wherein the circuitry is further configured to:
cause the user terminal to compete with at least one other user terminal for free radio resources using the device-to-device common control channel of at least one resource block set of the plurality of resource block sets; and
cause the user terminal to transmit a transmission when a clear-to-send information is correctly received by the user terminal.

9. The user terminal according to claim 6, wherein the circuitry is further configured to:
sense a usage of spectrum when the user terminal is idle;
provide the sensed usage of the spectrum to other user terminals to enable sharing of radio resources distributed locally between different device-to-device communication links; and
feed back the sensed usage of the spectrum to the base station for reconfiguring the size of the resource block sets.

10. The user terminal according to claim 9, wherein in case of sensing congestion in a used frequency, the circuitry is further configured to shift the used frequency band without negotiating with other user terminals so that at least one resource block set of the plurality of resource block sets overlaps between shifted and un-shifted frequency bands.

11. The user terminal according to claim 9, wherein in case of sensing congestion in a used frequency band and a free frequency band is non-overlapping with the used frequency band, the circuitry is further configured to transfer the used frequency band to the free frequency band through a new resource competition procedure.

12. The user terminal according to claim 6, wherein the part of the radio spectrum that is available comprises Television White Spaces and Industrial, Scientific and Medical (ISM) frequency bands.

13. The user terminal according to claim 6, wherein the device-to-device common control channel of the resource block sets comprises a ready-to-send sub-channel, a clear-to-send sub-channel, a data control information sub-channel and an acknowledgement information sub-channel.

14. The user terminal according to claim 13, wherein the ready-to-send sub-channel comprises a transmission requirement message from the user terminal to a receiving user terminal, comprising identification (ID) data for both terminals;
the clear-to-send sub-channel comprises a response message from the receiving user terminal to the user terminal on at least one resource block set, sent when no transmission requirement message conflict exists in the receiving user terminal and corresponding resource block sets are applicable for use;
the data control information sub-channel comprises at least one of data format and buffer size; and
the acknowledgement information sub-channel comprises information whether data transmission is acknowledged (ACK) or not (NAK).

15. The user terminal according to claim 14, wherein in a single resource competition, data, is sent between the user terminal and the receiving user terminal in the following order: the transmission requirement message, the response message, data control information, the data and acknowledgement information.

16. A non-transitory computer readable medium comprising computer readable instructions that, when executed by circuitry, causes the circuitry to perform steps for resource sharing between user terminals in device-to-device communications, the steps comprising:
obtaining, at a user terminal, frequency and timing synchronization with adjacent user terminals, through at least one of downlink and uplink synchronization with a base station operating in licensed bands;
receiving, at the user terminal, a primary or secondary synchronization signal from the base station to synchronize frequency and timing with the adjacent user terminals;
establishing a device-to-device communication in a white space band;
partitioning a radio spectrum for device-to-device communication into a radio resource grid including a plurality of resource block sets, the radio spectrum being the white space band;
dividing each resource block set of the plurality of resource block sets in a part of the radio spectrum that is available into a device-to-device common control channel and a device-to-device data channel;
setting a virtual central frequency as a reference for the partitioning of the radio spectrum for device-to-device communication into the radio resource grid;
configuring a size of the resource block sets by the base station, the resource block sets comprising plurality of resource blocks, a resource block set being a partitioning unit of a two-dimensional radio resource grid of time and frequency corresponding to the radio resource grid; and
partitioning the radio resource grid between used, free and unusable radio resources of at least one communication system.

* * * * *